April 9, 1935.  A. J. FAUSEK ET AL  1,996,991
CUTTING TORCH
Filed Sept. 25, 1930    2 Sheets-Sheet 2

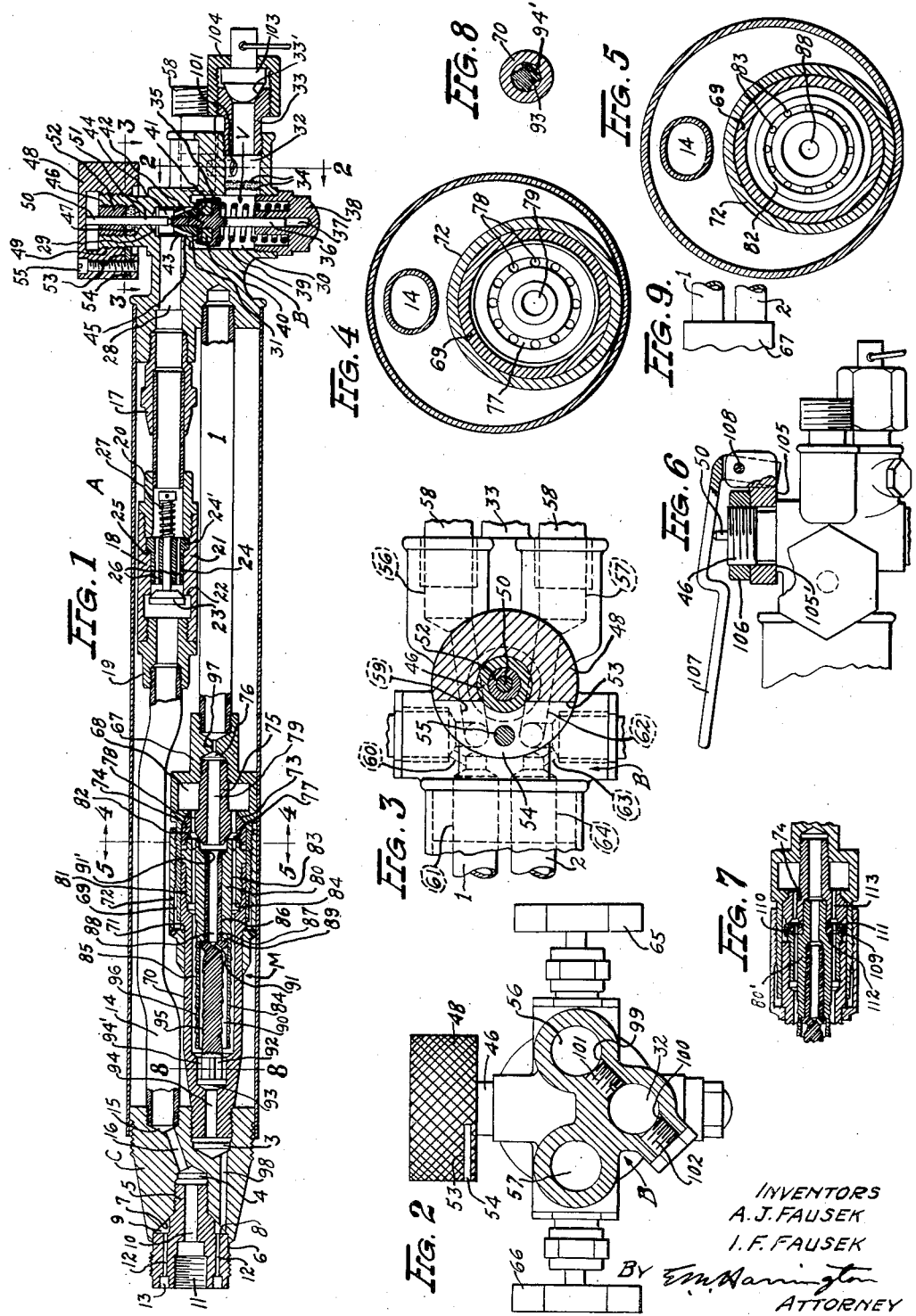

Inventors:
A. J. Fausek and
I. F. Fausek
by E. M. Harrington, Attorney.

Patented Apr. 9, 1935

1,996,991

UNITED STATES PATENT OFFICE 1,996,991

CUTTING TORCH

Arthur J. Fausek and Irwing F. Fausek, Clayton, Mo.

Application September 25, 1930, Serial No. 484,362

6 Claims. (Cl. 158—27.4)

This invention relates generally to gas-burning torches and more specifically to torches of this type which are employed in performing metal cutting operations in connection with cutting machines, the predominant object of the invention being to provide an improved torch of this type, provided with a tail piece which is so constructed and arranged that either two or three flexible conductors may be employed to conduct gas from the gas receptacles to the torch.

Another object of the invention is to produce an improved torch of this type which is provided with an improved valve construction for controlling passage of the high pressure gas through the torch.

Another object of the invention is to provide a cutting torch provided with an improved mixing chamber structure, this structure including means for guiding and supporting certain parts of the mixing chamber at opposite ends of said mixing chamber, and a unique joint between the mixing chamber and an adjacent part of the torch structure.

Still another object of the invention is to produce a torch structure which includes a check valve in the high pressure tube thereof to prevent back firing of the gas within the torch.

Figure 1 is a longitudinal section through the improved torch.

Figure 2 is a cross-section on line 2—2 of Figures 1 and 11.

Figure 3 is a horizontal section on line 3—3 of Figures 1 and 11.

Figure 4 is a cross-section on line 4—4 of Figures 1 and 10.

Figure 5 is a cross-section on line 5—5 of Figures 1 and 10.

Figure 6 is a fragmentary detail illustrating a modified form of the gas-controlling valve of the torch.

Figure 7 is a fragmentary sectional detail illustrating a modified form of the mixing chamber construction.

Figure 8 is a cross-section on line 8—8 of Figure 1.

Figure 9 is a fragmentary view showing the manner in which the gas tubes are connected to the mixing chamber

Figure 10:
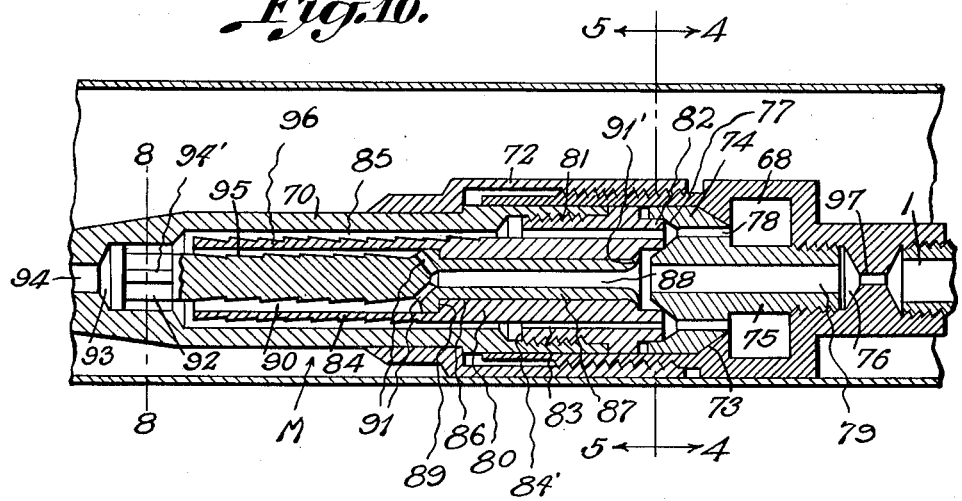
Figure 10 is an enlarged fragmentary sectional detail illustrating the mixer structure of the improved torch.

In the drawings, wherein is shown for the purpose of illustration, merely, several embodiments of the invention A designates our improved torch generally, said torch including a tail piece B and a head C. Extended from the tail piece is an oxygen tube 1 and an acetylene tube 2 which lead to a mixing chamber M, said mixing chamber being screwed into a cavity 3 in the head C. The head C is provided with a centrally located screwthreaded cavity 4 into which the screwthreaded extension 5 of a tip coupling 6 is screwed, said head being provided with an annular inclined face 7 with which a shoulder 8 on the tip coupling cooperates to provide an annular gas passageway 9. The tip coupling 6 is provided with a central gas passageway 10 having an enlarged screwthreaded portion 11 which receives a screwthreaded extension on the tip (not shown), and also said coupling is provided with a plurality of passageways 12 which lead from the annular gas passageway 9 to an annular depression 13 at the forward face of the tip coupling.

14 designates a high pressure oxygen tube, the forward end portion of which is screwed into a screwthreaded cavity 15 in the head C of the torch, said cavity 15 being placed in communication with the central cavity 4 of the torch head by a passageway 16. At its rear end the tube 14 is connected by a coupling element 17 to the tail piece of the torch, and located within the length of said tube 14 is a check valve 18. The check valve 18 includes a coupling element 19 attached to the front section of the tube 14 and a similar coupling element 20 attached to the rear section of said tube 14. These coupling elements 19 and 20 are connected together by a sleeve 21 which is provided with a shoulder 22, and 23 designates a valve element which engages said shoulder. The stem of the valve element 23 is extended through an opening formed through an inner member 24, said inner member being provided with an annular flange 24' which is confined between an annular shoulder 25 within the sleeve 21 and the forward end of the coupling element 20. The inner member 24 is provided with oxygen passageways 26 formed therethrough, and the stem of the valve element has a coil spring 27 associated with it in a manner to cause said valve element to be drawn rearwardly so as to seat the head portion of the valve element against the shoulder 22.

In the use of the torch oxygen will pass forwardly, from the tail piece B to the head C of the torch without hindrance from the check valve 18, said oxygen unseating said check valve as it passes the head portion of the valve element 23. However, should the direction of flow of the oxygen be reversed the valve element will be seated by the rearwardly moving gas whereby rearward movement of the oxygen is arrested and back-firing prevented.

Figure 11:
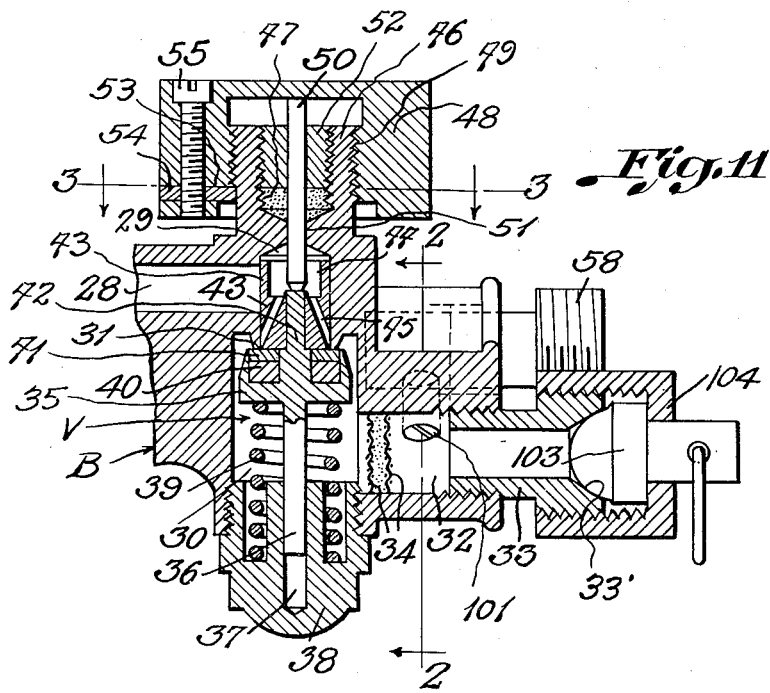
Figure 11 is an enlarged fragmentary sectional detail showing the valve located in the tail piece of the torch.

Formed in the tail piece B is an oxygen passageway 28. The passageway 28 communicates at its forward end with the tube 14 and at its rearmost end with an opening 29 which is extended at an approximate right angle to said passageway 28. The lower portion of the opening 29 is enlarged as indicated at 30 in Figures 1 and 11, and at the upper end of this enlarged portion the torch structure is provided with a valve seat 31. 32 designates an oxygen passageway which communicates with the space 30, said passageway being screwthreaded at its outer end and having a hose coupling 33 screwed into said screwthreaded outer end. Arranged within the passageway 32 is a pair of spaced screens 34 between which a body of sand, or other suitable granular material is located. The structure comprised of the screens and body of sand, or like material, permits passage of gas forwardly therethrough during normal operation of the torch. However, should the torch back-fire and flame move rearwardly through the torch, such flame will be arrested by the structure referred to.

Arranged in the openings 29 and 30 is a valve V which controls passage of oxygen through the tube 14. The valve referred to includes a valve head 35 with which a downwardly extended stem 36 is associated. The stem 36 is extended into an opening 37 formed in a plug 38 which seals the lower end of the opening 30, and a coil spring 39 is interposed between a shoulder on said plug and said valve head whereby said valve head is urged upwardly. The valve head 35 is provided with a cavity in which a valve seat 40 is arranged, said valve seat being formed of any yieldable material suitable for this purpose. Arranged adjacent to the top face of the valve seat 40 is a layer 41 of a fire resistant material, such as thin gage annealed metal, asbestos, or other suitable material. The valve seat 40 and the layer of material 41 may be anchored in place within the cavity of the valve head 35 in any suitable manner, for instance, the top edge portion of the circumferential wall of said cavity may be turned inwardly slightly so as to overlap said elements and in this manner clamp them in place. Extended upwardly from the valve head 35 is a steam 42 which passes through centrally located apertures in the valve sea 40 and layer of material 41. The portion of the upwardly extended stem which is located above the layer of material 41 is slightly reduced in diameter and this stem portion extends through an aperture formed through the bottom wall of an extension 43 forming a part of the valve. The upper end portion of the stem 42 is riveted over to securely fix the extension 43 to said stem, the lower face of the bottom wall of said extension being in contact with a shoulder formed on the stem 42 where the reduced upper portion joins the larger lower portion thereof. The extension 43 is located in the space 29 as shown clearly in Figures 1 and 11, and said extension is provided with a cavity 44 in its upper portion. Also the extension 43 is provided with a plurality of inclined oxygen passageways 45 which lead from the cavity 44 to the circumferential face of the extension at points immediately above the lower edge of said extension.

Extended upwardly from the tail piece of the torch is an externally screwthreaded portion 46, this portion of the tail piece being provided with a screwthreaded cavity 47 extended downwardly from the top face thereof. Mounted on the portion 46 of the tail piece B is a valve operating element 48 which comprises a member having a knurled circumferential face. The element 48 is provided with a centrally located, screwthreaded opening 49 formed therein which receives the portion 46 of the tail piece B, the external screwthreads on the portion 46 being engaged by the screwthreads within the opening 49. Extended downwardly from the top wall of the opening 49 within the valve operating element 48 is a stem 50, the lower end of which contacts with the riveted over upper end of the stem 42 of the valve head. The stem 50 passes through an opening 51 at the lower end of the portion 46 of the tail piece, and also said stem passes through an opening formed through a packing nut 52 in the cavity 47 which causes packing material located in the lower portion of said cavity to seal the aperture 51 and prevent escape of oxygen therethrough. The valve operating element 48 is provided with a slot 53 in which a semi-circular plate 54 is located. This plate is secured in place by a suitable fastening device 55 and engages the bottom face of the lowermost external screwthread of the portion 46 of the tail piece 20 as to prevent accidental removal of the valve operating element when same is rotated.

In the use of the torch the valve operating element 48 may be rotated to cause same to move downwardly on the screwthreaded exterior face of the portion 46 of the tail piece. This will result in the stem 50 transmitting like movement to the valve V whereby the valve head 35 will be moved away from the valve seat 31 and the extension 43 is moved across and away from the passageway 28 so as to cause said passageway 28 to communicate with the space 29. When the valve V has moved downwardly a sufficient distance the lower ends of the passageways 45 will be exposed below the lower edge of the valve seat 31 whereupon oxygen will flow from the passageway 32 and space 30 through the passageways 45 and cavity 44 into the space 29, and from said space 29 through the passageway 28 to the tube 14.

The burning of the valve seats 40 in torches of this type is a source of much annoyance and in our torch we provide a number of safeguards. First, we provide the check valve 18 which reduces to a minimum any likelihood of back firing in the passageway 28. Second, we provide the valve V having the extension 43 which provides what may be termed a flame baffle, in that it extends across the passageway 28. Also this extension is provided with the small passageways 45 through which flame would have to pass to reach the combustible valve seat. And third, we provide the combustible valve seat with a fire resistant covering which prevents the flame from reaching the combustible valve seat. It will be seen, therefore, that the valve seat 40 is very well protected from flame resulting from back-firing of the torch, hence the likelihood that the valve seat will be burned is rendered quite remote.

Formed in the tail piece B of the torch A is a pair of passageways 56 and 57 (Figures 2 and 3), each of these passageways being open at the rear end of the tail piece where they are screwthreaded to receive hose couplings 58. The passageway 56 is an oxygen passageway and the passageway 57 is an acetylene passageway. The passageway 56, through the instrumentality of passageways 59, 60, and 61 is placed in communication with the oxygen tube 1 already referred to, while the passageway 57, through the instrumentality of passageways 62, 63 and 64 is placed in communication with the acetylene tube 2 (Figure 3). 65 designates a suitable valve by means of which passage of oxygen to the tube 1 may be controlled and 66 designates a similar valve which serves to control passage of acetylene to the tube 2.

The tubes 1 and 2, as already stated, are connected to the mixing chamber M, the tube 1 being an oxygen tube and the tube 2 being an acetylene tube. The mixing chamber M includes a member 67 which is provided with an annular space 68, said member 67 also including a forwardly extended sleeve portion 69. Arranged in telescoping relation with the sleeve portion 69 of the member 67 is a tubular element 70, the forward end portion of which is screwed into the cavity 3 of the head C of the torch. The tubular element 70 is provided with an annular shoulder 71 which is engaged by a shoulder within a coupling element 72, and said coupling element is provided with internal screwthreads which engage external screwthreads on the sleeve portion of the member 67 whereby said tubular element 70 and said member 67 are connected together. The member 67 of the mixing chamber is provided with an annular inclined face 73 with which an annular inclined face of an inner member 74 contacts, said inner member being provided with an extension 75 having a screwthreaded end portion which is screwed into a screwthreaded cavity 76 in the member 67. At its forward face the inner member 74 is provided with an annular depression 77 provided with inclined walls, and 78 designates acetylene passageways which lead from the space 68 within the member 67 to the base of the annular depression 77 in the inner member 74. The inner member 74 is of such diameter at its forward end that it fits closely within the interior of the sleeve portion 69 of the member 67, and said inner member is provided with an oxygen passageway 79 formed centrally therethrough.

80 designates a member which constitutes a part of the inner structure of the mixing chamber M. This member is provided with external screwthreads 81 which engage internal screwthreads located at the rearmost end of the tubular element 70 whereby said member 80 and the tubular element 70 are secured together. At its rearmost face the member 80 is provided with an annular extension 82 which is seated in the annular depression 77 formed in the forward face of the inner member 74, the rectangular corners of the annular extension contacting closely with the inclined walls of the annular depression. The member 80 is provided with a plurality of acetylene passageways 83 which lead from the rearmost face of the annular extension 82 to a shoulder 84' located forwardly of said annular extension, and said member 80 also includes a tubular portion 84 which extends forwardly of the torch. The tubular portion 84 of the member 80 is located within an elongated space 85 within the tubular element 70, the circumferential face of said tubular portion 84 being spaced from the wall of the space 85 to provide an annular acetylene space at the rear end of which the forward ends of the gas passageways 83 are located.

The rearward portion of the member 80 is provided with an elongated opening 86 formed therethrough and extended through said opening is the rear portion of a core 87, this rear core portion having an oxygen passageway 88 formed therethrough. The forward portion of the core 87 is of slightly greater diameter than the rear portion thereof and is provided with a shoulder 89 which contacts with a shoulder located within the member 80. The forward portion of the core 87 is of such diameter that an annular space 90 is provided between the outer face of said core portion and the wall of the space within which it is located. The core 87 is also provided with a plurality of oxygen passageways 91 which place the annular space 90 in communication with the oxygen passageway 88 formed in the rear portion of the core. The core 87 is rigidly fixed to the member 80 preferably by having the rear end portion thereof riveted over so as to engage said member 80 as suggested at 91' in Figures 1 and 10, and at its opposite end said core is supported by having its forward end portion 92 seated in an opening 93 in the tubular element 70. In order to provide space for the passage of mixed gas between the outer face of the forward end of the core and the wall of the space 93, we provide said forward end of the core with longitudinally extended and circumferentially spaced ribs 94. Thus spaces are provided between the ribs and between the core and the wall of the space 93 through which mixed gas may pass. The space 93 is placed in communication with the cavity 3 in the head C by a passageway 94.

The forward portion of the core 87 is provided with annular depressions 95 on its circumferential face and the outer face of the tubular portion 84 of the member 80 is provided with like depressions 96. Each of these depressions is provided with a bottom wall which inclines inwardly toward the center of the element in which it is formed from front to back, and a shoulder is provided at the rear end of said inclined bottom wall. Thus the core 87 and tubular portion 84 are provided with annular shoulders which have been found in practice to eliminate to a great extent backfiring of the torch. Instead of providing shoulders which are arranged at a substantial right angle to the axes of the core 87 and tubular portion 84 we may provide spiral shoulders which would serve also to give the gas passing through the mixing chamber a whirling motion.

The tube 1 is arranged in communication with the passageway 79 in the inner member 75 by a passageway 97 and the tube 2 communicates with the space 68 therein. The oxygen passes through the passageways 97, 79, 88, 91 and annular space 90 to the forward end of the tubular portion 84 of the member 80, while the acetylene passes from the space 68 through the passageways 78, 83 and the annular space 85 to the forward end of said tubular portion. The gases referred to are then commingled and pass through the cavity 3, passageway 98 to the annular space 9 and from said annular space through the passageways 12 to the tip of the torch. During such passage of the gases from the tubes 1 and 2 oxygen from the tube 14 passes through the passageways 16, 10, and 11 to the central passageway of the tip in the well known manner.

By referring now to Figures 1 and 2 of the drawings it will be noted that the oxygen passageways 32 and 56 are placed in communication with each other by a communicating passageway 99, and it will be noted also that the wall of the passageway 32 is provided with an opening 100, said passageway 99 and opening 100 being alined with each other longitudinally. The passageway 99 is screwthreaded so as to receive a screwthreaded plug 101 which serves to close said passageway, and the opening 100 is likewise screwthreaded to receive a plug 102 which closes said opening.

In the use of our torch it is desirable at certain times to use two hoses for conducting oxygen and acetylene from the containers to the torch, and at other times it is desirable to employ three hoses for this purpose. When three hoses are to be used in the operation of the torch the hoses are attached to the hose couplings associated with the passageways 32, 56, and 57 in the usual manner and oxygen and acetylene passes from the hoses through said passageways, the plugs 101 and 102 being in place as shown in Figure 2 so that each passageway is distinct from the other. When, however, it is desired to employ two hoses, only, the plug 102 is removed and a screwdriver or other suitable element is passed through the opening 100 and the plug 101 is removed from the communicating passageway 99. The plug 102 is then replaced in the opening 100 and the rearmost end of the gas passageway 32 is sealed by means of a closure element 103 provided with a curved face which engages an annular inclined face 33' on the hose coupling 33 associated with the passageway 32, said closure element being secured in place by a nut 104 which is screwed on the screwthreaded outer end of the hose coupling. With this arrangement in operation oxygen passes into the passageway 56 from the hose associated therewith and some of said oxygen will continue through the tube 1. The remainder of the oxygen referred to, however, will pass through the communicating gas passageway 99 into the passageway 32 and will eventually pass through the tube 14. It is seen, therefore, that either two or three hoses may be used with our improved torch by making only simple adjustments, thus eliminating the need for the production of two types of torches as heretofore.

In Figure 6 we illustrate a pivoted handle for operating the valve V, this arrangement involving the use of a collar 105 which surrounds the screwthreaded portion 46 of the tail piece B and is seated upon the shoulder 105'. The collar is fixed in place on the tail piece by a nut 106 which is screwed on the portion 46, and a lever 107 is pivoted at 108 to said collar. The lever 107 contacts with the valve stem 50 and said stem may be moved downwardly to unseat the valve by depressing the forward end of the lever 107.

In Figure 7 we employ a gasket 109 between the rear face of the member 80' and the forward face of the inner member 74', said gasket including a body of yieldable material 110 covered by a shell 111 of soft metal. The gasket is provided with apertures 112 which register with the passageways 78' in the inner member 74 and the passageways 83 in the member 80, and said gasket is provided with a central opening through which an extension 113 on the member 80 extends.

We claim:

1. A gas torch having a mixing chamber including an outer shell, a member having a sleeve portion with which said outer shell telescopes, means for connecting said outer shell and said member together, a tubular element located within the mixing chamber and having a reduced portion at one end thereof forming an annular gas chamber, the other end of said tubular element having passages formed therein communicating with said annular chamber, a core disposed within said tubular element, said core having a gas passageway formed through a portion thereof and having another portion spaced from an inner face of said tubular element to provide an annular gas space which is arranged in communication with said gas passageway by gas ports extended through said core, and a ported element associated with said member with which the outer shell telescopes, said element being provided with an annular depression provided with inclined walls, said tubular element being provided with an annular extension which is seated in said depression, said ported element having ports communicating with the passages in said tubular element and another port communicating with the passage in said core, and means for conducting gases to the ported element.

2. A gas torch having a mixing chamber including an outer shell, a member having a sleeve portion with which said outer shell telescopes, means for connecting said outer shell and said member together, a tubular element located within the mixing chamber and having a reduced portion at one end thereof forming an annular gas chamber, the other end of said tubular element having passages formed therein communicating with said annular chamber, a core disposed within said tubular element, said core having a gas passageway formed through a portion thereof and having another portion spaced from an inner face of said tubular element to provide an annular gas space which is arranged in communication with said gas passageway by gas ports extended through said core, a ported element associated with said member with which the outer shell telescopes, said element being provided with an annular depression provided with inclined walls, said tubular element being provided with an annular extension which is seated in said depression, an extension at an end of said core seated in an opening in said outer shell, said ported element having ports communicating with the passages in said tubular element and another port communicating with the passage in said core, and means for conducting gases to the ported element.

3. A gas torch having a mixing chamber including an outer shell, a member having a sleeve portion with which said outer shell telescopes, means for connecting said outer shell and said member together, a tubular element located within the mixing chamber and having a reduced portion at one end thereof forming an annular gas chamber, the other end of said tubular element having passages formed therein communicating with said annular chamber, a core disposed within said tubular element, said core having a gas passageway formed through a portion thereof and having another portion spaced from an inner face of said tubular element to provide an annular gas space which is arranged in communication with said gas passageway by gas ports extended through said core, a ported element associated with said member with which the outer shell telescopes, said element being provided with an annular depression provided with inclined walls, said tubular element being provided with an annular extension which is seated in said depression, an extension at an end of said core seated in an opening in said outer shell, said extension on the core being located adjacent to one end of the mixing chamber and the annular extension on the tubular element being located at the opposite end of said mixing chamber, said ported element having ports communicating with the passages in said tubular element and another port communicating with the passage in said core, and means for conducting gases to the ported element.

4. A gas torch having a mixing chamber including an outer shell, a member having a sleeve portion with which said outer shell telescopes, means for connecting said outer shell and said member together, a tubular element located within the mixing chamber and having a reduced portion at one end thereof forming an annular gas chamber, the other end of said tubular element having passages formed therein communicating with said annular chamber, a core disposed within said tubular element, said core having a gas passageway formed through a portion thereof and having another portion spaced from an inner face of said tubular element to provide an annular gas space which is arranged in communication with said gas passageway by gas ports extended through said core, a ported element associated with said member with which the outer shell telescopes, said element being provided with an annular depression provided with inclined walls, said tubular element being provided with an annular extension which is seated in said depression, the joint between said ported element and the member with which it is associated being produced by inclined cooperating faces, said ported element having ports communicating with the passages in said tubular element and another port communicating with the passage in said core, and means for conducting gases to the ported element.

5. A gas torch having a mixing chamber comprising an outer tubular element, an inner tubular element located within said outer tubular element and spaced with respect thereto so as to provide an annular gas space between the walls of said tubular elements, a core within said inner tubular element, said core being of such diameter relative to the inner diameter of the inner tubular element as to provide an annular gas space between the circumferential face of the core and the inner face of the inner tubular element, the wall of one of said annular gas spaces being provided with one or more circumferential depressions, and independent gas conducting means for delivering gas to be mixed to the respective annular gas spaces.

6. A gas torch having a mixing chamber comprising an outer tubular element, an inner tubular element located within said outer tubular element and spaced with respect thereto so as to provide an annular gas space between the walls of said tubular elements, a core within said inner tubular element, said core being of such diameter relative to the inner diameter of the inner tubular element as to provide an annular gas space between the circumferential face of the core and the inner face of the inner tubular element, a wall of each of said annular gas spaces being provided with one or more circumferential depressions having inclined inner walls and independent gas conducting means for delivering gas to be mixed to the respective annular gas spaces.

ARTHUR J. FAUSEK.
IRWING F. FAUSEK.